(No Model.)
F. P. BOUTEILLER.
WINDMILL.
No. 343,000.     Patented June 1, 1886.
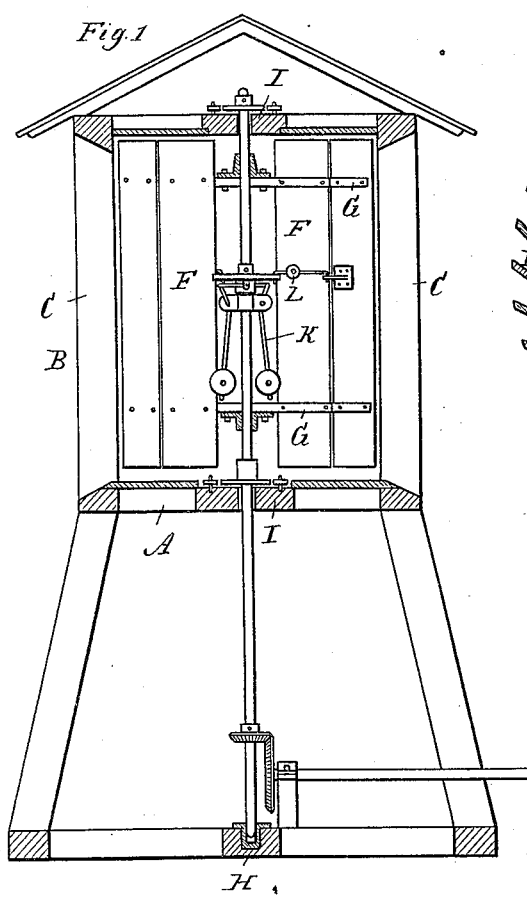
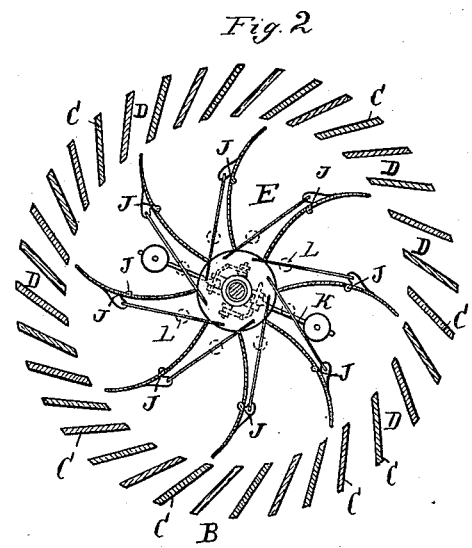
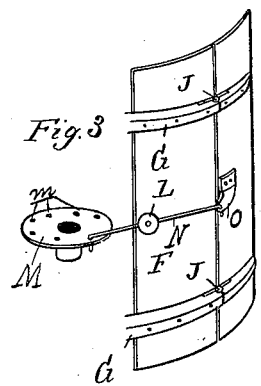
Attest:
John Schuman.
Inventor:
Frederick P. Bouteiller
by his Atty
Thos. S. Sprague
N. PETERS, Photo-Lithographer, Washington, D. C.

United States Patent Office.

FREDERICK PETER BOUTEILLER, OF ESSEX COUNTY, CANADA.

WINDMILL.

SPECIFICATION forming part of Letters Patent No. 343,000, dated June 1, 1886.

Application filed March 25, 1886. Serial No. 196,466. (No model.)

*To all whom it may concern:*

Be it known that I, FREDERICK P. BOUTEILLER, residing in the county of Essex and Dominion of Canada, have invented new and useful Improvements in Wind Mills or Engines; and I do hereby declare that the following is a full, clear, and exact description thereof, reference being had to the accompanying drawings, which form a part of this specification.

This invention relates to a new and useful improvement in windmills; and my invention has particular reference to that class of windmills which rotate on a vertical axis.

My invention consists in the novel arrangement and construction of the parts of a horizontal windmill, all as hereinafter described, and pointed out in the claims.

In the drawings which accompany this specification, Figure 1 is a vertical central section of my improved windmill. Fig. 2 is a horizontal section thereof, and Fig. 3 is a detached perspective of one of the sails.

My improved windmill is arranged and constructed as follows: A is a circular platform, supported either on a solid foundation or upon a suitable frame. B is a cylindrical curb, the wall of which is formed by a series of stationary wind-guides, C, forming between them the throats D, through which the wind enters and acts upon the sails of the wind-wheel.

The wind-wheel E is placed concentrically within the curb, and has a series of vertical sails, F, which are secured to the radial curved arms G. The whole wheel is mounted on a vertical shaft, which rests in a step, H, below the wheel, and is firmly held in its positions by suitable bearings, I, which, when the wheel is built on a larger scale, are constructed on the anti-friction principle, so as to take up the lateral thrust of the wheel with the least loss of power. The sails F are concave in cross-section, and reach in close proximity to the inner edges of the wind-guides, and extend well toward the center of the wheel. I preferably make them of sheet metal and construct them in two sections, the inner one being fast on the wheel, while the outer sections turn on hinges J.

To control the velocity of the wheel, I construct a governor, K, which rotates with the shaft of the wheel and turns the sails in and out of the wind, as required, by its varying centrifugal force. All the sails are connected to the governor, as shown, and it will be observed that as the velocity of the wheel increases the hinged sections of the sails are turned in the direction of the wind. This has the advantage that the sails are thereby rapidly shortened, while at the same time the wind finds a less obstructed passage through the mill.

I construct the outer curb with a large number of wind-guides, which enables me to throw the wind more on the outer edge of the sails, thus gaining in leverage, while at the same time the wind is rapidly cut off from the sails after it has become tangential to the wheel, thus preventing a retarding action.

When the wind-wheel is constructed on a large scale, I provide the governor-connections with adjustable weights L, as shown, which assist the governor and make its operation more sensitive.

M is a disk sleeved on the shaft, said disk being provided with a plurality of openings, $m$, to receive the hooked ends of the governor-connection N, as shown, the other ends of said connection N being hooked into eyes O, secured to the sails, as shown. The weights L are sleeved on these connections.

It will be evident that as the speed of the engine increases the centrifugal force generated by such increased speed will cause the weights L to tend to fly outward, and thus assist the goveror. It will also be evident that the farther from the center of the shaft the weights are secured on the rods the greater will be their motion, and the more power they will exert to close the sails.

What I claim as my invention is—

1. In a windmill, the combination, with the vertical shaft and the adjustable sails, of the disk M on said shaft, the governor, the connections N between said disk and sails, and the adjustable weights L on said connections, substantially as described.

2. In a horizontal windmill, the combination, with the vertical shaft, the disk M sleeved thereon, and provided with a plurality of holes, $m$, and the governor, of the adjustable sails, the eyes O, secured thereto, the connections N, having hooked ends engaging said holes and eyes, and the weights L, adjustably sleeved on said connections, substantially as described.

FREDERICK PETER BOUTEILLER.

Witnesses:
H. S. SPRAGUE,
A. BARTHEL.